(12) United States Patent
Kang

(10) Patent No.: US 11,721,323 B2
(45) Date of Patent: *Aug. 8, 2023

(54) METHOD AND APPARATUS WITH SPEECH PROCESSING

(71) Applicant: SAMSUNG ELECTRONICS CO., LTD., Suwon-si (KR)

(72) Inventor: Tae Gyoon Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

This patent is subject to a terminal disclaimer.

(21) Appl. No.: 17/083,854

(22) Filed: Oct. 29, 2020

(65) Prior Publication Data

US 2021/0335339 A1 Oct. 28, 2021

(30) Foreign Application Priority Data

Apr. 28, 2020 (KR) .................. 10-2020-0051269

(51) Int. Cl.
*G10L 15/02* (2006.01)
*G10L 15/10* (2006.01)

(52) U.S. Cl.
CPC .............. *G10L 15/02* (2013.01); *G10L 15/10* (2013.01)

(58) Field of Classification Search
CPC ......... G10L 15/02; G10L 15/10; G10L 15/32; G10L 15/26; G10L 15/22; G10L 15/04;
(Continued)

(56) References Cited

U.S. PATENT DOCUMENTS 9,990,918 B1 6/2018 Chan et al.
10,573,312 B1 * 2/2020 Thomson ................ G10L 15/22
(Continued)

FOREIGN PATENT DOCUMENTS

JP 2008-148121 A 6/2008
JP 2010-032792 A 2/2010
(Continued)

OTHER PUBLICATIONS

Chiu, Chung-Cheng, et al. "A Comparison of End-to-End Models for Long-Form Speech Recognition." *2019 IEEE Automatic Speech Recognition and Understanding Workshop (ASRU)*. IEEE, 2019. (8 pages in English).

(Continued)

*Primary Examiner* — Thuykhanh Le
(74) *Attorney, Agent, or Firm* — NSIP Law

(57) ABSTRACT

A method, the method includes determining a target segment from a speech signal, determining a target character sequence corresponding to the target segment by decoding the target segment, identifying a first overlapping portion between the target character sequence and a preceding character sequence based on an edit distance, and merging the target character sequence and the preceding character sequence based on the first overlapping portion. A cost applied to the edit distance is determined based on any one or any combination of any two or more of a type of operation performed at the edit distance, whether characters to be operated are located in the first overlapping portion, and whether the characters to be operated match.

26 Claims, 10 Drawing Sheets

(58) Field of Classification Search
CPC ......... G10L 15/12; G10L 25/30; G10L 25/45; G10L 2015/223; G06F 40/166
USPC .......................................................... 704/231
See application file for complete search history.

(56) References Cited

U.S. PATENT DOCUMENTS

| | | | | |
|---|---|---|---|---|
| 11,138,980 B2* | 10/2021 | Yoshioka | ............... | G10L 15/30 |
| 11,363,399 B2* | 6/2022 | MacKinnon | ........... | H04S 7/301 |
| 2005/0171768 A1* | 8/2005 | Gierach | ................. | G10L 25/87 |
| | | | | 704/E11.005 |
| 2006/0215841 A1* | 9/2006 | Vieilledent | ............ | H04S 1/007 |
| | | | | 381/1 |
| 2006/0265216 A1* | 11/2006 | Chen | .................... | G10L 19/005 |
| | | | | 704/228 |
| 2007/0005343 A1* | 1/2007 | Sandor | ................. | G06F 16/951 |
| | | | | 707/E17.108 |
| 2008/0033723 A1* | 2/2008 | Jang | ........................ | G10L 25/78 |
| | | | | 704/254 |
| 2011/0196932 A1* | 8/2011 | Jackson | ................ | H04L 51/043 |
| | | | | 709/206 |
| 2012/0170514 A1* | 7/2012 | Lo | ........................ | H04W 52/262 |
| | | | | 370/328 |
| 2012/0191457 A1* | 7/2012 | Minnis | ................... | G10L 13/10 |
| | | | | 704/E13.011 |
| 2012/0239384 A1* | 9/2012 | Mukai | ................... | G10L 21/01 |
| | | | | 704/200 |
| 2013/0226563 A1* | 8/2013 | Hirate | ................... | G06F 40/247 |
| | | | | 704/9 |
| 2013/0246048 A1* | 9/2013 | Nagase | .................. | G06F 40/40 |
| | | | | 704/9 |
| 2015/0080266 A1* | 3/2015 | Volkmuth | .............. | G16B 20/00 |
| | | | | 702/19 |
| 2015/0187359 A1* | 7/2015 | Bhaskaran | ............. | G10L 17/08 |
| | | | | 704/235 |
| 2015/0269431 A1* | 9/2015 | Haji | ....................... | G06V 40/30 |
| | | | | 382/186 |
| 2015/0310863 A1 | 10/2015 | Chen et al. | | |
| 2015/0347393 A1* | 12/2015 | Futrell | ................... | G06F 40/30 |
| | | | | 704/9 |
| 2016/0055144 A1* | 2/2016 | Huang | .................. | G06F 40/232 |
| | | | | 704/9 |
| 2017/0025119 A1* | 1/2017 | Song | ..................... | G10L 15/197 |
| 2017/0048596 A1* | 2/2017 | Fonseca, Jr. | ....... | H04N 21/8456 |
| 2017/0161260 A1* | 6/2017 | Wang | .................... | G06F 40/205 |
| 2017/0309297 A1 | 10/2017 | Arsikere et al. | | |
| 2017/0364495 A1* | 12/2017 | Srinivasan | ............ | G06F 3/0484 |
| 2017/0364502 A1* | 12/2017 | Ganesalingam | ...... | G06F 40/274 |
| 2018/0075508 A1* | 3/2018 | Hewavitharana | ....... | G06F 16/50 |
| 2018/0247643 A1 | 8/2018 | Battenberg et al. | | |
| 2019/0221213 A1 | 7/2019 | Shah et al. | | |
| 2019/0286242 A1* | 9/2019 | Ionescu | .................. | G06N 20/20 |
| 2019/0325899 A1* | 10/2019 | Dehghani | ............... | G10L 25/21 |
| 2020/0065097 A1* | 2/2020 | Figuli | ................. | G06F 9/30036 |
| 2020/0126538 A1* | 4/2020 | Han | ...................... | G10L 15/063 |
| 2020/0175993 A1* | 6/2020 | Cho | ........................ | G10L 15/04 |
| 2020/0293574 A1* | 9/2020 | Urbain | .................. | G06F 16/68 |
| 2020/0410992 A1* | 12/2020 | Lee | ......................... | G10L 15/26 |
| 2021/0037006 A1* | 2/2021 | Belenko | ............... | H04L 63/0823 |
| 2021/0157975 A1* | 5/2021 | Gelosi | .................. | G06F 40/166 |
| 2021/0304784 A1* | 9/2021 | Paine | ...................... | G10L 25/51 |
| 2021/0327410 A1* | 10/2021 | Beaufays | ................ | G10L 15/22 |
| 2021/0375397 A1* | 12/2021 | Gnerre | .................. | G16B 20/20 |
| 2022/0039741 A1* | 2/2022 | Gosztolya | ............... | G10L 25/66 |

FOREIGN PATENT DOCUMENTS

| | | |
|---|---|---|
| JP | 2010-211122 A | 9/2010 |
| JP | 2018-049058 A | 3/2018 |
| JP | 6605774 B1 | 11/2019 |
| KR | 10-2012-0072145 A | 7/2012 |
| KR | 10-2015-0052600 A | 5/2015 |
| KR | 10-2018-0130933 A | 12/2018 |

OTHER PUBLICATIONS

Chiu, et al. "A Comparison of End-to-End Models for Long-Form Speech Recognition." *2019 IEEE Automatic Speech Recognition and Understanding Workshop (ASRU)*. IEEE, 2019. (8 pages in English).

Extended European Search Report dated May 17, 2021 in counterpart European Patent Application No. 20212778.3 (8 pages in English).

\* cited by examiner

510 The end-to-end speech recognition algorithm has been widely studied
520 and showed competitive performance to conventional speech

FIG.5

610 The end-to-end speech recognition algorithm has been widely studied and showed competitive performance to conventional speech
620 convolutional speech recognition methods
630
640
650

FIG.6

METHOD AND APPARATUS WITH SPEECH PROCESSING

CROSS-REFERENCE TO RELATED APPLICATIONS

This application claims the benefit under 35 USC § 119(a) of Korean Patent Application No. 10-2020-0051269 filed on Apr. 28, 2020 in the Korean Intellectual Property Office, the entire disclosure of which is incorporated herein by reference for all purposes.

BACKGROUND

1. Field

The following description relates to a method and apparatus with speech processing.

2. Description of Related Art

Speech recognition technology may be used to recognize a user's speech. The recognized speech of the user may be converted into text through speech recognition. With the development of speech recognition technology, users have a growing need for voice commands to control devices or act as agents. However, it is difficult to guarantee optimal performance due to the limited training data for models performing speech recognition or the ambient noise in speech signals.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method, the method includes determining a target segment from a speech signal, determining a target character sequence corresponding to the target segment by decoding the target segment, identifying a first overlapping portion between the target character sequence and a preceding character sequence based on an edit distance, and merging the target character sequence and the preceding character sequence based on the first overlapping portion. A cost applied to the edit distance is determined based on any one or any combination of any two or more of a type of operation performed at the edit distance, whether characters to be operated are located in the first overlapping portion, and whether the characters to be operated match.

The cost for the edit distance may be applied differently to the first overlapping portion and a non-overlapping portion between the target character sequence and the preceding character sequence.

An insertion cost for the edit distance incurred in a non-overlapping portion between the target character sequence and the preceding character sequence may be less than an insertion cost incurred in the first overlapping portion.

A matching cost for the edit distance may be less than an insertion cost for the edit distance incurred in a non-overlapping portion between the target character sequence and the preceding character sequence.

An insertion cost, a deletion cost, and a substitution cost for the edit distance incurred in the first overlapping portion may be positive numbers.

A matching cost for the edit distance may be a negative number, and an insertion cost for the edit distance incurred in a non-overlapping portion between the target character sequence and the preceding character sequence may be zero.

The determining of the target segment from the speech signal may include determining the target segment from the speech signal based on a segment length and an overlap length between segments.

The overlap length between the segments may be determined based on available resources of an apparatus that performs the method.

The identifying may include identifying a second overlapping portion between the target character sequence and a partial sequence extracted from the preceding character sequence according to a maximum character length to be uttered by a user during an overlap length between segments.

The preceding character sequence may be determined based on a result of decoding a preceding segment partially overlapping the target segment in the speech signal.

The identifying may include identifying a third overlapping portion between the target segment and the result of decoding the preceding segment included in the preceding character sequence.

The first overlapping portion in the target segment may be less than half the target segment.

A non-transitory computer-readable storage medium may store instructions that, when executed by one or more processors, configure the one or more processors to perform the method.

In another general aspect, an apparatus, includes one or more processors configured to determine a target segment from a speech signal, determine a target character sequence corresponding to the target segment by decoding the target segment, identify an overlapping portion between the target character sequence and a preceding character sequence based on an edit distance, and merge the target character sequence and the preceding character sequence based on the overlapping portion. A cost applied to the edit distance is determined based on any one or any combination of any two or more of a type of operation performed at the edit distance, whether characters to be operated are located in the overlapping portion, and whether the characters to be operated match.

The cost for the edit distance may be applied differently to a non-overlapping portion between the target character sequence and the preceding character sequence and to the overlapping portion.

A matching cost for the edit distance may be less than an insertion cost for the edit distance incurred in a non-overlapping portion between the target character sequence and the preceding character sequence.

An insertion cost, a deletion cost, and a substitution cost for the edit distance incurred in the overlapping portion between the target character sequence and the preceding character sequence may be positive numbers.

The one or more processors may be configured to determine the target segment from the speech signal based on a segment length and an overlap length between segments.

The overlap length between the segments may be determined based on available resources of the apparatus.

The preceding character sequence may be determined based on a result of decoding a preceding segment partially overlapping the target segment in the speech signal.

In another general aspect, a method includes determining segments from a speech signal, determining character sequences to the segments, respectively, by decoding the segments, identifying overlapping portions between adjacent ones of the character sequences based on corresponding edit distances of the adjacent ones of the character sequences, and merging the adjacent ones of the character sequences based on corresponding ones of the overlapping portions. A cost applied to each of the corresponding edit distances is determined based on any one or any combination of any two or more of a type of operation performed at a corresponding one of the edit distances, whether characters to be operated are located in a corresponding one of the overlapping portions, and whether the characters to be operated match.

The cost applied to each of the corresponding edit distances may be applied differently to corresponding ones of the overlapping portions and non-overlapping portions between the adjacent ones of the character sequences.

Insertion costs for the corresponding edit distances in corresponding ones of the non-overlapping portions and the overlapping portions may be different.

Insertion costs, deletion costs, and substitution costs for the edit distance incurred in the overlapping portions may be positive numbers.

The determining of the segments from the speech signal may be based on respective segment lengths and overlap lengths between adjacent segments.

The overlap lengths between the adjacent segments may be determined based on available resources of an apparatus that performs the method.

Other features and aspects will be apparent from the following detailed description, the drawings, and the claims.

BRIEF DESCRIPTION OF THE DRAWINGS

FIGS. 4 through 6 illustrate an example of integrating character sequences.

Figure 1:
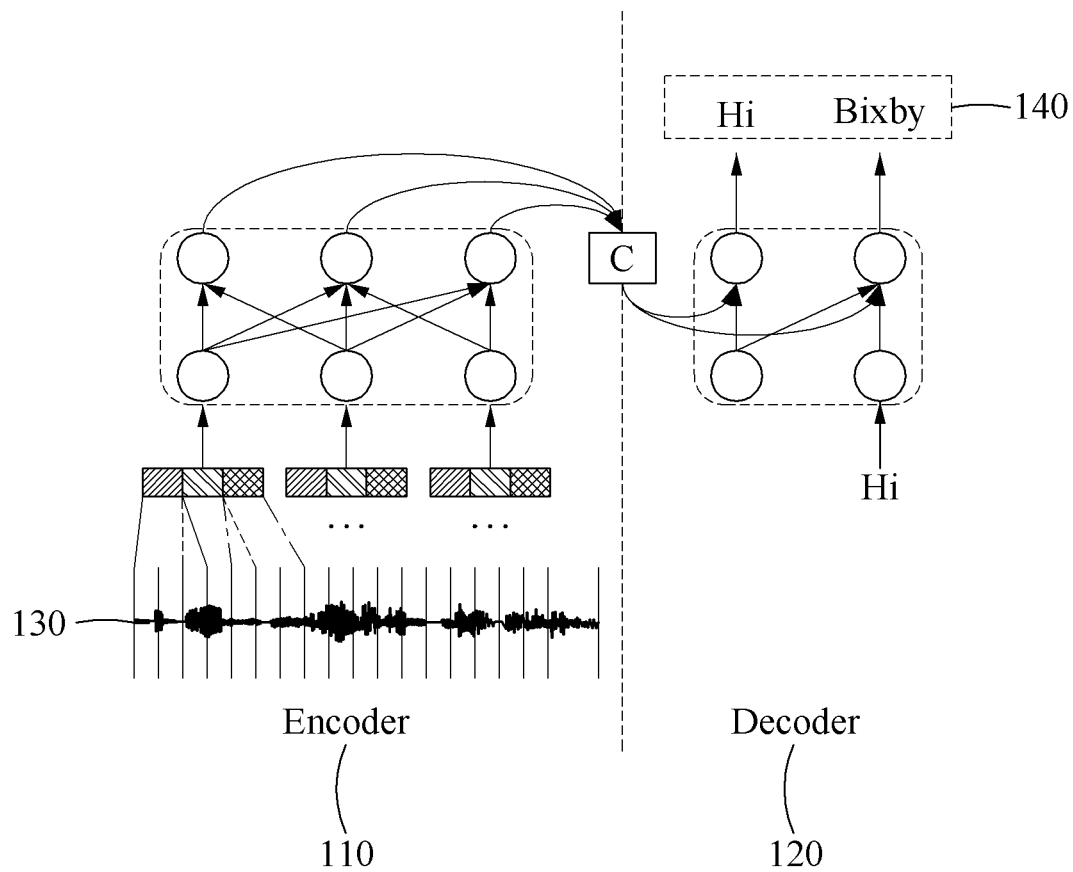
FIG. 1 illustrates an example of processing a speech based on a neural network.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein will be apparent after an understanding of this application to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

FIG. 1 illustrates an example of processing a speech based on a neural network.

In FIG. 1, a neural network for processing speech may include an encoder 110 and a decoder 120. A speech processing apparatus may recognize a speech signal 130 of a user using the encoder 110 and the decoder 120, and determine a character sequence 140 as a result. The encoder 110 may generate context information of the speech signal 130 by encoding the provided speech signal 130, and the decoder 120 may output a gradually recognized character sequence 140 by decoding the context information as a recognition result. The decoder 120 may iteratively perform a process of inferring an expected subsequent word by providing a preceding word of a predetermined point in time as an input of a subsequent point in time until the recognition is terminated. The encoder 110 and the decoder 120 may be speech recognition models trained to output a corresponding speech recognition result in response to the input of the speech signal 130 of the user. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

As described above, the speech processing includes speech recognition based on the encoder 110 and the decoder 120. Due to limited training data for networks and the limitation of the length of training data for training efficiency, recognition accuracy may decrease when a speech signal longer than the training data. To prevent this, a relatively long speech signal is divided into a plurality of segments, individually performing speech recognition on each of the segment using the encoder 110 and the decoder 120, and integrating resulting character sequences as recognition results. Hereinafter, a detailed description will be provided with reference to the following drawings.

Figure 2:
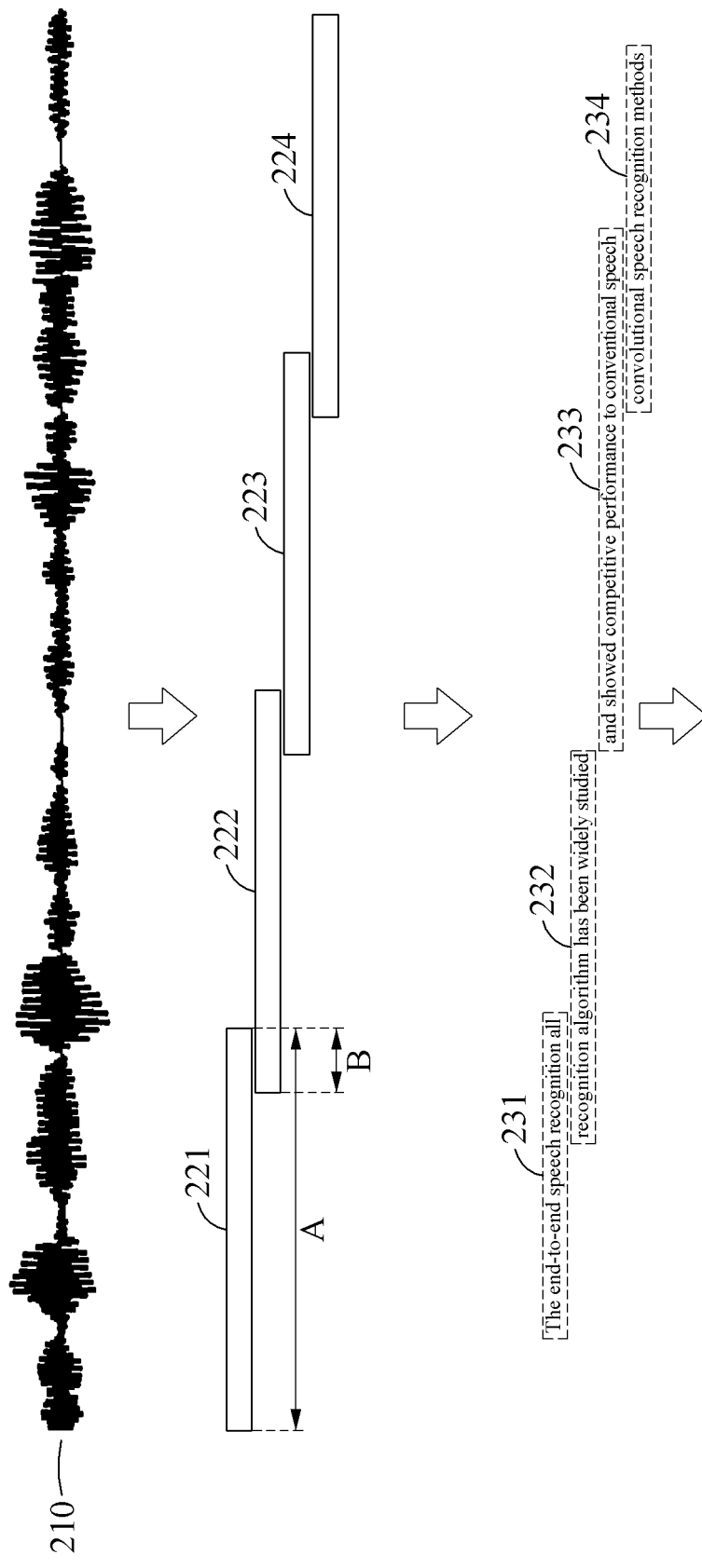
FIGS. 2 and 3 illustrate examples of a speech recognition process.
Figure 3:
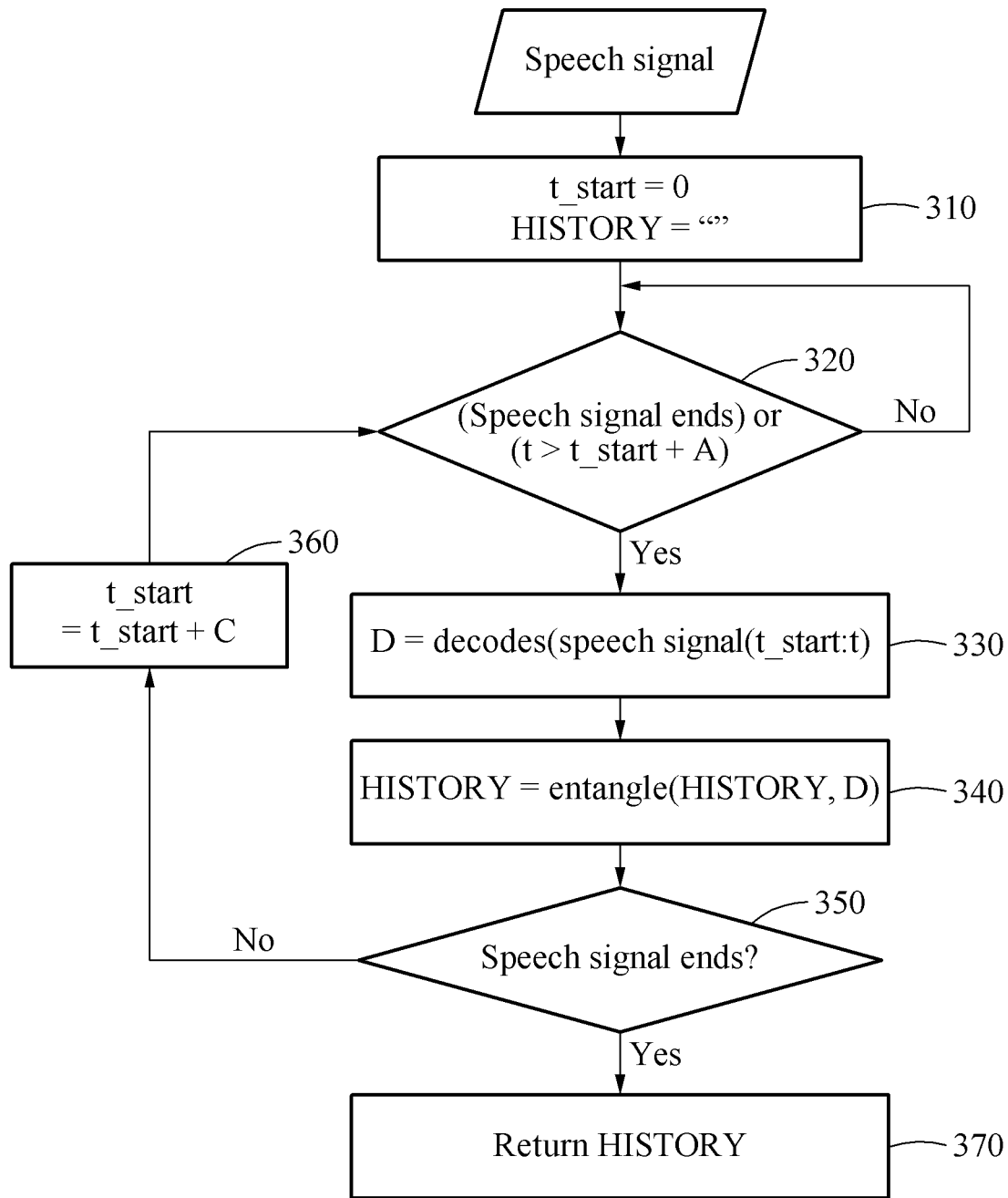

FIGS. 2 and 3 illustrate examples of a speech recognition process.

In FIG. 2, a speech processing apparatus may determine a plurality of character sequences 231 to 234 by dividing a long speech signal 210 into a plurality of segments 221 to 224, and individually performing speech recognition thereon. A speech recognition result 240 of the long speech signal 210 is obtained by merging the plurality of character sequences 231 to 234. Herein, the term "segment" may also be referred to as "chunk" or "window" for ease of description. A long speech signal 210 comprises plural segments.

The speech processing apparatus may divide the long speech signal 210 into the plurality of segments 221 to 224. For example, the speech processing apparatus may divide the long speech signal 210 into the plurality of segments 221 to 224 based on a segment length A and an overlap length "B" between segments.

In an example, the overlap length B may be determined to be less than half the segment length A. Since speech recognition is performed on each of the plurality of segments 221 to 224, which will be further described in detail later, an overlapping portion between adjacent segments may be twice-decoded. By setting the overlap length B to be less than half the segment length A, not all portions of the long speech signal 210 will be decoded twice, thus, minimizing computational overhead. In a non-limiting example, the segment length A may be determined to be "8" seconds, and the overlap length B between segments may be determined to be "2" seconds. However, various other values may be applied thereto.

The speech processing apparatus may dynamically determine the overlap length B between segments based on available resources. Since each segment on which speech recognition is performed is obtained from the long speech signal 210, according to predetermined criteria (for example, the segment length A and the overlap length B), the accuracy of speech recognition at a segment boundary in the middle of an utterance may be lower than that between utterances in the segment. To compensate for a potential decrease in accuracy, it may be desirable to set the overlap length B between segments to be relatively long. However, as the overlap length B increases, the proportion of a portion to be twice-decoded in the long speech signal 210 increases, thereby increasing computational overhead. In an example where resources are sufficiently available and the performance of a predetermined level or higher is guaranteed even if the computational overhead increases, the speech processing apparatus may set the overlap length B to be longer than a preset threshold length. Conversely, in an example where resources are insufficient, the speech processing apparatus may set the overlap length B to be shorter than the preset threshold length, thereby preventing a decrease in performance caused by the increasing computational overhead.

In an example in which the speech processing apparatus is a server for speech recognition, if a small number of speech recognition operations are to be performed by the server, the overlap length B may be set to be longer than the preset threshold length. Conversely, if a large number of speech recognition operations are to be performed by the server, the overlap length B may be set to be shorter than the preset threshold length. In another example in which the speech processing apparatus is a user terminal such as a smart phone, if no operation other than the speech recognition operation is being performed by the user terminal, the overlap length B may be set to be longer than the preset threshold length. Conversely, if the speech recognition operation and other operations (for example, mobile game) are being concurrently performed by the user terminal, the overlap length B may be set to be shorter than the preset threshold length.

The speech processing apparatus may perform speech recognition on each of the plurality of segments 221 to 224 based on the encoder-decoder described in FIG. 1, and determine the plurality of character sequences 231 to 234 as a result. In further detail, the first character sequence 231 may be determined as a speech recognition result for the first segment 221, and similarly the other character sequences 232 to 234 may be determined as speech recognition results for the second segment 222 to the fourth segment 224, respectively.

The speech processing apparatus may determine the speech recognition result 240 corresponding to the long speech signal 210 by merging the plurality of character sequences 231 to 234. The speech processing apparatus may identify an overlapping portion between neighboring character sequences based on an edit distance, and merge the neighboring character sequences based on the overlapping portion. Here, the edit distance is a technique for quantifying a degree of difference between two character sequences by calculating a minimum cost of operations needed to convert a single character sequence into another character sequence. In this example, a cost applied thereto may be determined based on any one or any combination of any two or more of a type of operation (for example, insertion, change, and or deletion), locations of characters to be operated, and whether the characters to be operated match. Since the overlapping portion is a portion that is twice-decoded, one of the decoding results may be selected and included in the speech recognition result 240. A process of identifying an overlapping portion and merging character sequences will be further described later in detail.

FIG. 3 is a flowchart illustrating an example of a speech recognition process for a long speech signal.

In operation 310, in response to a speech signal being input, in an example, a speech processing apparatus may initialize a start time t_start of a target segment, on which speech recognition is to be performed, to zero, and initialize HISTORY in which speech recognition results are accumulated, to an empty value. While the start time t_start of the target segment in this example is initialized to zero, the example is not limited thereto.

In operation 320, the speech processing apparatus may verify whether the speech signal includes a speech utterance within a period from the start time t_start to the segment length A, or whether the speech signal ends before that. Through this, the speech processing apparatus may obtain a target segment by extracting a portion of the speech signal from the start time t_start to the segment length A. Alternatively, if the speech signal ends before a portion from the start time t_start to the segment length A is extracted, the speech processing apparatus may obtain a portion from the start time t_start to the extracted thus far, as the target segment.

In operation 330, the speech processing apparatus may obtain a target character sequence D that is a result of decoding the extracted target segment.

In operation 340, the speech processing apparatus may merge the target character sequence D and HISTORY, and store a merging result as HISTORY. At first, an empty value is stored in HISTORY. Thus, the target character sequence D obtained in operation 330 may be stored in HISTORY as it is. If it is not the first time, a preceding character sequence is stored in HISTORY. Thus, the speech processing apparatus may identify an overlapping portion between the target character sequence D and HISTORY, merge the target character sequence D and HISTORY based on the identified portion, and store a merging result as HISTORY. Since the overlapping portion is a portion twice-decoded, one of the decoding results may be selected and stored in HISTORY. As described above, the results of performing speech recognition on the segments of the speech signal may be sequentially accumulated in HISTORY. An example of a process of merging character sequences will be further described later with reference to FIGS. 4 through 6.

In operation 350, the speech processing apparatus may verify whether the speech signal ends. If the speech signal does not end, operation 360 may be performed. Conversely, if the speech signal ends, operation 370 may be performed.

In operation 360, the speech processing apparatus may increase the start time t_start of the target segment by a shift time C. The shift time C may be set to be greater than half the segment length A and smaller than the segment length A, thereby minimizing computational overhead. The shift time C may be dynamically determined based on available resources of the speech processing apparatus. For example, if the available resources are sufficient, the shift time C may be set to be close to half the segment length A, and conversely, if the available resources are insufficient, the shift time C may be set to be close to the segment length A.

In operation 370, the speech processing apparatus may return a character sequence accumulated in HISTORY as a result of recognizing the speech signal.

Figure 4:
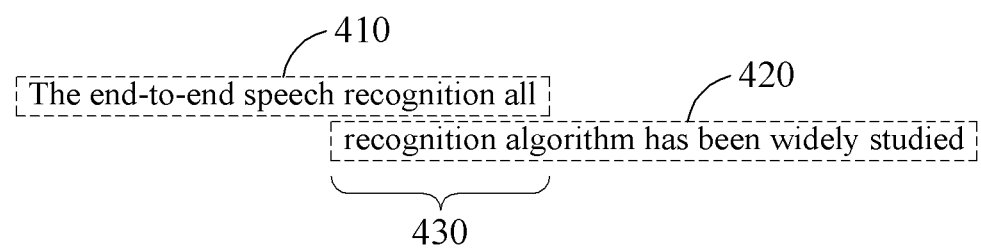

FIGS. 4 through 6 illustrate an example of integrating character sequences.

In FIG. 4, an example of merging a target character sequence 420 with a preceding character sequence 410 is illustrated. FIG. 4 shows an example of an initial operation in a speech processing method. The preceding character sequence 410 may be a result of decoding a first segment extracted from a speech signal and the target character sequence 420 may be a result of decoding a second segment, subsequent to the first segment, extracted from the speech signal.

The speech processing apparatus may identify an overlapping portion 430 between the preceding character sequence 410 and the target character sequence 420 based on an edit distance. A cost applied to the edit distance may be determined based on, at least, one of a type of operation (for example, insertion, change, or deletion) to be performed at the edit distance, whether characters to be operated are located in an overlapping portion between two character sequences, and whether the characters to be operated match. The cost applied to the edit distance will be further described with reference to FIG. 7.

As shown in the example of FIG. 4, the preceding character sequence 410 and the target character sequence 420 may be aligned at a character level based on the overlapping portion 430 between the preceding character sequence 410 and the target character sequence 420. In this example, the cost for the edit distance between the preceding character sequence 410 and the target character sequence 420 is the lowest.

The preceding character sequence 410 and the target character sequence 420 that are aligned may be merged as further described below.

First, remaining portions, except for the overlapping portion 430, of the preceding character sequence 410 and the target character sequence 420, that is, non-overlapping portions, may be decoded once, and thus, corresponding decoding results may be utilized as they are. On the other hand, the overlap portion 430 is twice-decoded, and corresponding decoding results are included in the preceding character sequence 410 and the target character sequence 420, respectively. Accordingly, one of the decoding results for the overlapping portion 430, included in the preceding character sequence 410 and the target character sequence 420, needs to be selected.

For example, the speech processing apparatus may identify a word boundary in the overlapping portion 430. The word boundary may be a spacing between words in a decoding result. In addition, the speech processing apparatus may designate identified word boundaries as transition candidates, and select, as a transition point, one transition candidate located closest to the center of the overlapping portion 430 from the designated transition candidates. In addition, the speech processing apparatus may merge the preceding character sequence 410 and the target character sequence 420, by connecting all words before the transition point in the preceding character sequence 410, to all words after the transition point in the target character sequence 420. Since each segment boundary may correspond to a cut-off portion of the speech signal and, thus, have a lower recognition accuracy than the center of a segment, the preceding character sequence 410 and the target character sequence 420 may be merged based on a transition point located at the center of the overlapping portion 430 to obtain a merging result of a higher recognition accuracy.

In the example of FIG. 4, the word boundary in the overlapping portion 430 may be determined between "recognition" and "all" in the preceding character sequence 410 and determined between "recognition" and "algorithm" in the target character sequence 420, and the corresponding portion may be designated as a transition candidate. In this example, the single transition candidate is located at the center of the overlapping portion 430 and thus, may be selected as a transition point. Then, the words "The end-to-end speech recognition" before the transition point in the preceding character sequence 410 and the words "algorithm has been widely studied" after the transition point in the target character sequence 420 may be connected, and "The end-to-end speech recognition algorithm has been widely studied" may be determined to be a merging result. The last word "all" in the preceding character sequence 410 is obtained by erroneously recognizing "algorithm" as "all" when the speech signal is cut off. Through the method described above, it is possible to effectively prevent the erroneously recognized word from being included in the merging result.

The merging result determined in FIG. 4 may be merged with a result of decoding a subsequent target segment, which will be described later with reference to FIG. 5.

In FIG. 5, an example of merging a target character sequence 520 with a preceding character sequence 510 is illustrated. Here, the preceding character sequence 510 is the merging result obtained in the example of FIG. 4, and the target character sequence 520 is a result of decoding a third segment extracted from the speech signal.

The speech processing apparatus may identify an overlapping portion between the preceding character sequence 510 and the target character sequence 520 based on an edit distance. As in the example of FIG. 5, there may be no overlapping portion between the preceding character sequence 510 and the target character sequence 520, and as a result, the preceding character sequence 510 and the target character sequence 520 may be aligned not to overlap each other. As described above, the non-overlapping portion may be included in a merging result by utilizing the previous decoding result as is. Thus, the preceding character sequence 510 and the target character sequence 520 may be connected as they are, such that "The end-to-end speech recognition algorithm has been widely studied and showed competitive performance to conventional speech" may be determined to be the merging result. The merging result determined in FIG. 5 may be merged with a result of decoding a subsequent target segment, which will be described later with reference to FIG. 6.

In FIG. 6, an example merging a target character sequence 620 with a preceding character sequence 610 is illustrated. Here, the preceding character sequence 610 is the merging result obtained in example of FIG. 5, and the target character sequence 620 is a result of decoding a fourth segment extracted from the speech signal.

The speech processing apparatus may identify an overlapping portion 630 between the preceding character sequence 610 and the target character sequence 620 based on an edit distance. As in the example of FIG. 6, the preceding character sequence 610 and the target character sequence 620 may be aligned at a character level based on the overlapping portion 630. In this example, a cost for the edit distance between the preceding character sequence 610 and the target character sequence 620 is the lowest.

The entire preceding character sequence 610 may be considered when identifying the overlapping portion 630 based on the edit distance. However, in some examples, only a portion of the preceding character sequence 610 may be considered. For example, since a limited character length may be uttered by a user during an overlap length between segments, a partial sequence 640 corresponding to a maximum character length that may be uttered by the user may be extracted from the preceding character sequence 610. By calculating an edit distance between the partial sequence 640 and the target character sequence 620, the overlapping portion 630 may be identified even with a relatively small number of operations. In another example, the preceding character sequence 610 is obtained by merging the results of decoding the first to third segments, wherein a decoding result 650 for the third segment corresponding to the last segment may overlap the target character sequence 620. Thus, by calculating an edit distance between the decoding result 650 for the third segment and the target character sequence 620, the overlapping portion 630 may be identified even with a relatively small number of operations. In this example, the third segment is a segment immediately preceding a target segment and will be referred to as the preceding segment for ease of description.

The preceding character sequence 610 and the target character sequence 620 aligned based on the overlapping portion 630 may be merged according to the method described above, and "The end-to-end speech recognition algorithm has been widely studied and showed competitive performance to conventional speech recognition methods" may be determined to be a merging result. In the example of FIG. 6, the first word "conventional" of the overlapping portion 630 in the preceding character sequence 610 is different from the first word "convolutional" of the overlapping portion 630 in the target character sequence 620. However, "conventional" may be included in the merging result based on transition points designated as a spacing between "conventional speech" and a spacing between "convolutional speech".

Figure 7:
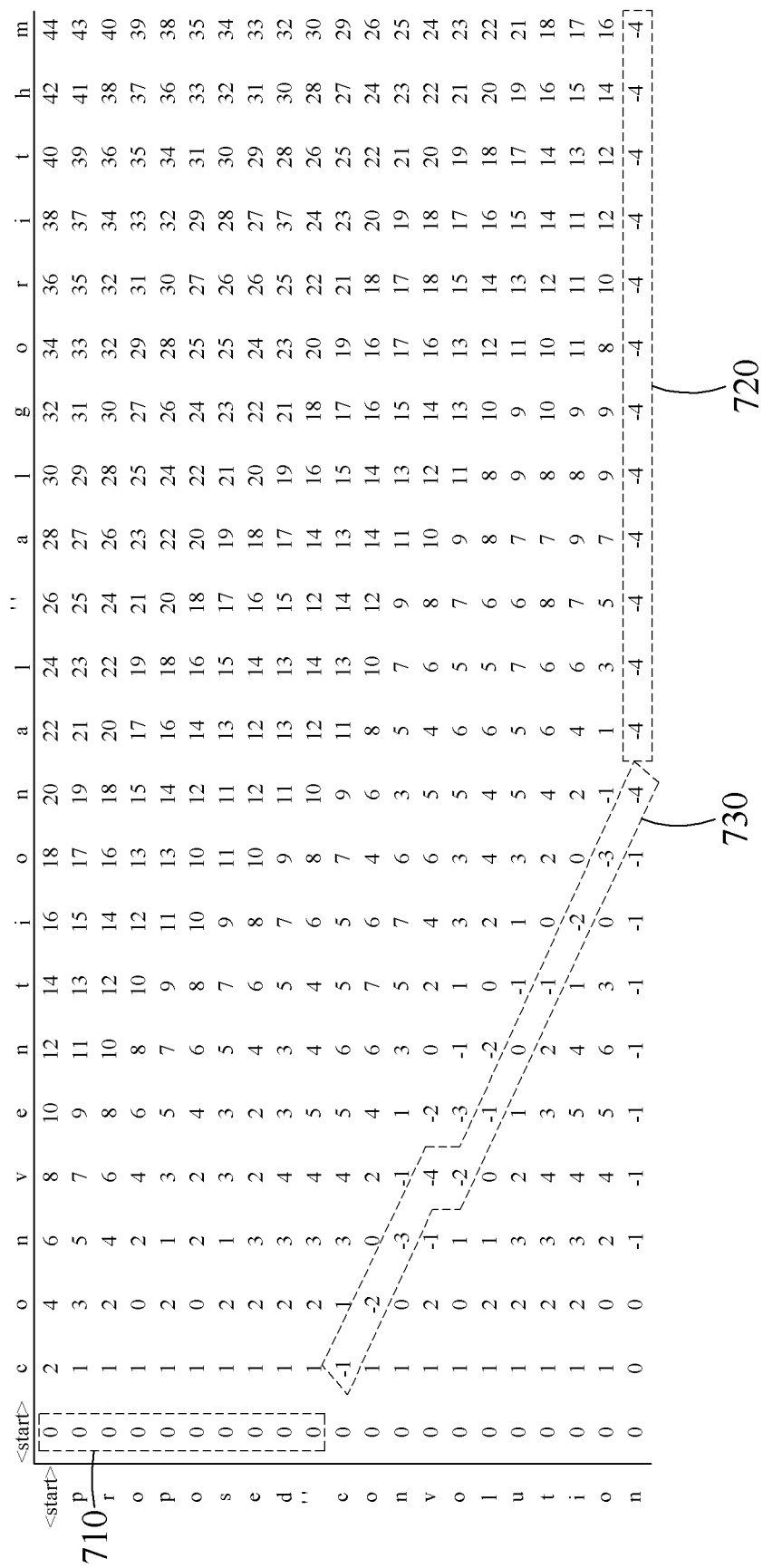
FIG. 7 illustrates an example of an edit distance.

FIG. 7 illustrates an example of an edit distance.

In FIG. 7, an example of calculating an edit distance between a target character sequence and a preceding character sequence is illustrated. In an example illustrated in table of FIG. 7, "proposed convolution" in the first column is the preceding character sequence, "conventional algorithm" of the first row is a target character sequence, and "included in the first row and the first column denotes a spacing.

The edit distance is a technique for quantifying a degree of difference between two character sequences by calculating a minimum cost of operations needed to convert a single character sequence into another character sequence. For ease of description, the process of calculating the minimum cost of operations may be represented by a table as shown in FIG. 7.

A cost applied to the edit distance is determined based on at least one of a type of operation (for example, insertion, change, or deletion) to be performed at the edit distance, whether characters to be operated are located in an overlapping portion, and whether the characters to be operated match.

The cost for the edit distance may be applied differently to the overlapping portion and a non-overlapping portion between the target character sequence and the preceding character sequence. In other words, an insertion cost for the edit distance incurred in a non-overlapping portion may be less than an insertion cost incurred in the overlapping portion. For example, the insertion cost for the edit distance incurred in the non-overlapping portion may be "0", and the insertion cost incurred in the overlapping portion may be "2". In the example of FIG. 7, a front portion 710 of the preceding character sequence may be a non-overlapping portion and have the cost that remains the same without increasing as going down the table (that is, even if a character of the preceding character sequence is inserted). In addition, a rear portion 720 of the target character sequence may also be a non-overlapping portion and have the cost that remains the same without increasing as going to the right side of the table (that is, even if a character of the target character sequence is inserted). Conversely, the cost may increase by "2" every time a character is inserted into the overlapping portion, that is, the rear portion of the preceding character sequence or the front portion of the target character sequence.

In addition, an insertion cost, a deletion cost, and a substitution cost for the edit distance incurred in the overlapping portion may be positive numbers. In this example, each cost may be determined by tuning for a speech processing technique. For example, the insertion cost and/or the deletion cost for the edit distance incurred in the overlapping portion may be greater than the substitution cost for the edit distance. In detail, the insertion cost and/or the deletion cost for the edit distance incurred in the overlapping portion may be "2", and the substitution cost for the edit distance may be "1". This may be for recognizing, as a bigger error, a case in which a predetermined character is omitted from a recognition result than a case in which a predetermined character is recognized as another character due to noise in a speech recognition process.

In addition, a matching cost for the edit distance may be smaller than the insertion cost for the edit distance incurred in the non-overlapping portion. In other words, the matching cost may be set to a negative number (for example, "−1") which is less than "0", which is the insertion cost for the edit distance incurred in the non-overlapping portion. In the example of FIG. 7, the cost may decrease each time matching occurs in the overlapping portion 730.

When the edit distance is calculated by applying the costs as described above, the minimum cost of operations may be calculated in the overall aspect connecting a start point at the upper left end an end point at the lower right end in the table of FIG. 7. In the example of FIG. 7, "convolution" may be identified as an overlapping portion in the preceding character sequence "proposed convolution", and "conventional" may be identified as an overlapping portion in the target character sequence "conventional algorithm". As such, even if the front portion of the target character sequence and the rear portion of the preceding character sequence do not perfectly match, the overlapping portion may be identified based on the minimum cost of operations for the edit distance. As described above, the edit distance is calculated in the unit of characters and thus, may be applicable to any language for general purpose.

Figure 8:
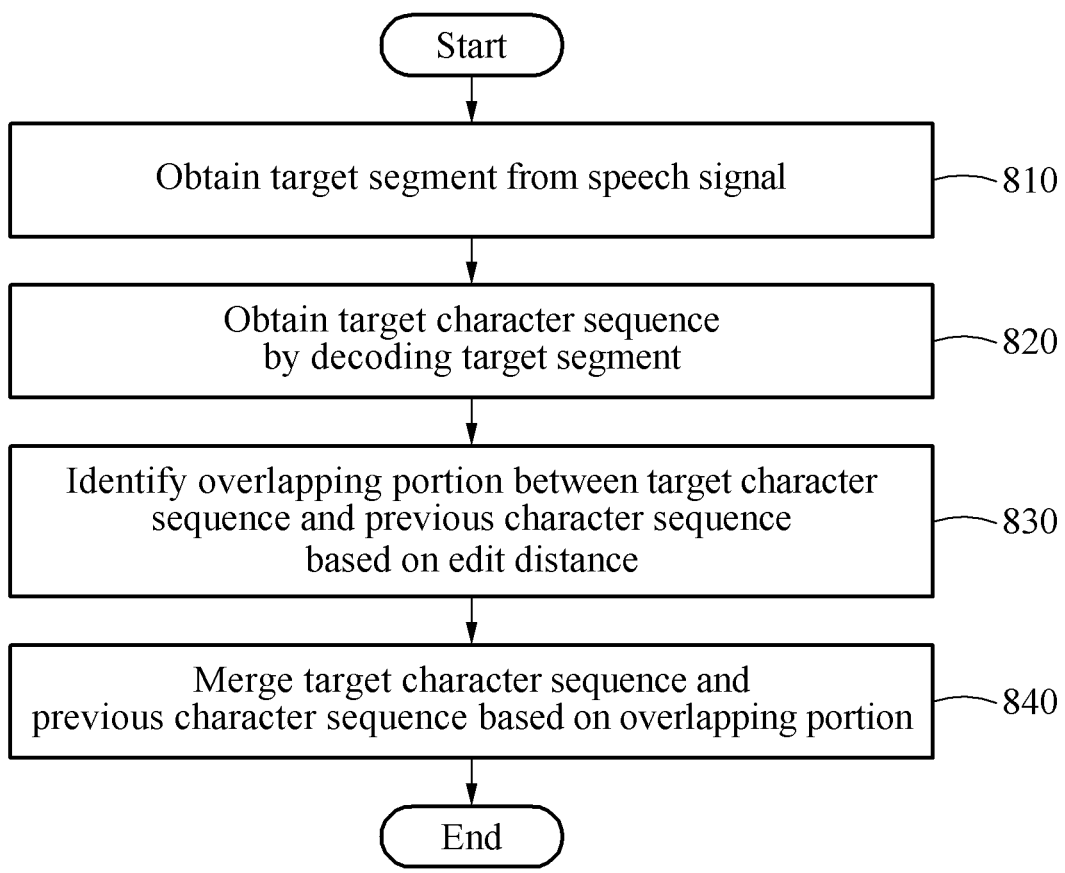
FIG. 8 illustrates an example of a speech processing method.

FIG. 8 illustrates an example of a speech processing method.

In FIG. 8, an example of a speech processing method performed by a processor provided in a speech processing apparatus is illustrated.

In operation 810, the speech processing apparatus obtains or determines a target segment from a speech signal. The speech processing apparatus may obtain the target segment from the speech signal based on a segment length and an overlap length between segments. The overlap length between segments may be determined based on available resources of the speech processing apparatus.

In operation 820, the speech processing apparatus obtains a target character sequence corresponding to the target segment by decoding the target segment.

In operation 830, the speech processing apparatus identifies an overlapping portion between the target character sequence and a preceding character sequence based on an edit distance. A cost applied to the edit distance is determined based on at least one of a type of operation performed at the edit distance, whether characters to be operated are located in the overlapping portion, and whether the characters to be operated match. The cost for the edit distance may be applied differently to the overlapping portion and a non-overlapping portion between the target character sequence and the preceding character sequence. A matching cost for the edit distance may be a negative number, an insertion cost for the edit distance incurred in the non-overlapping portion may be "0", and a substitution cost for the edit distance and an insertion cost incurred in the overlapping portion may be positive numbers.

In operation 840, the speech processing apparatus merges the target character sequence and the preceding character sequence based on the overlapping portion.

The description provided with reference to FIGS. 1 through 7 also applies to the description of FIG. 8, and thus a detailed description will be omitted for conciseness.

Figure 9:
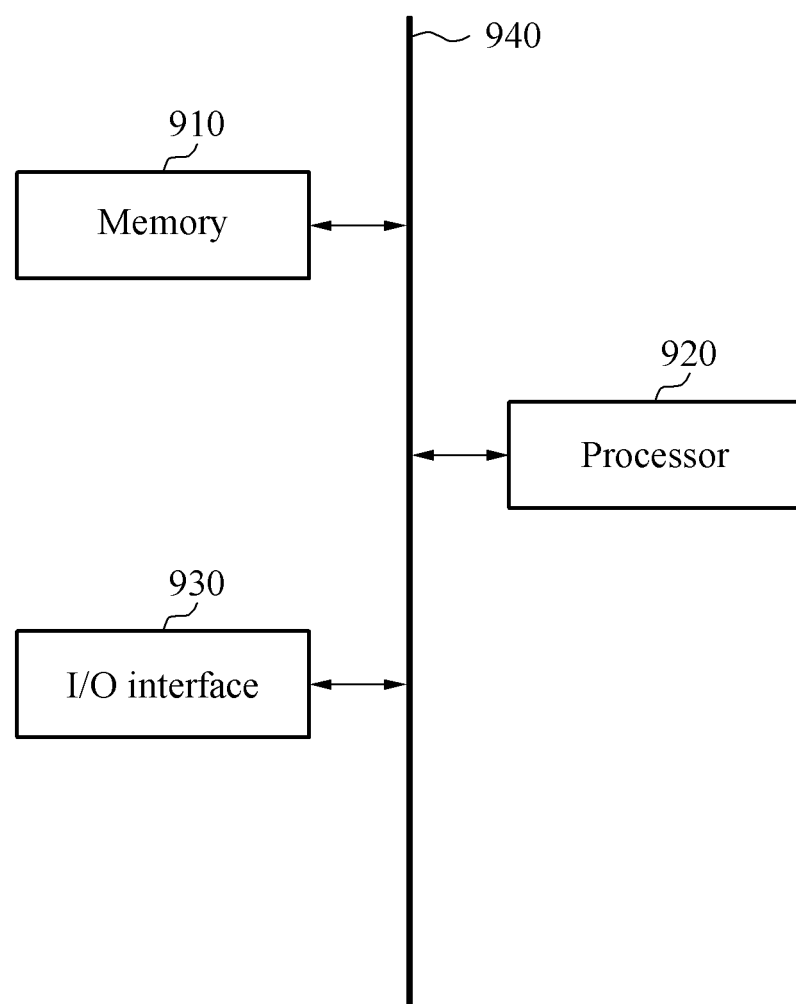
FIG. 9 illustrates an example of a speech processing apparatus.

FIG. 9 illustrates an example of a speech processing apparatus.

In FIG. 9, a speech processing apparatus 900 may include a memory 910, a processor 920, and an input/output interface 930. The memory 910, the processor 920, and the input/output interface 930 may communicate with each other through a bus 940.

The memory 910 may include computer-readable instructions. The processor 920 may perform the operations described above when the instructions stored in the memory 910 are executed by the processor 920. The memory 910 may include a volatile memory or a non-volatile memory.

The processor 920 is one or more devices that execute the instructions or programs or that control the speech processing apparatus 900, and may include, for example, a central processing unit (CPU), a graphics processing unit (GPU), and the like. The speech processing apparatus 900 may be connected to another device (for example, a microphone or an external device configured to obtain a speech signal of a user) through the input/output interface 930 to exchange data therewith. In addition, the speech processing apparatus 900 may process the operations described above.

A user terminal may include various computing devices such as a smart phone, a tablet, a laptop and a personal computer, various wearable devices such as a smart watch and smart glasses, various home appliances such as a smart speaker, a smart TV and a smart refrigerator, a smart car, a smart kiosk, and an Internet of things (IoT) device.

Figure 10:
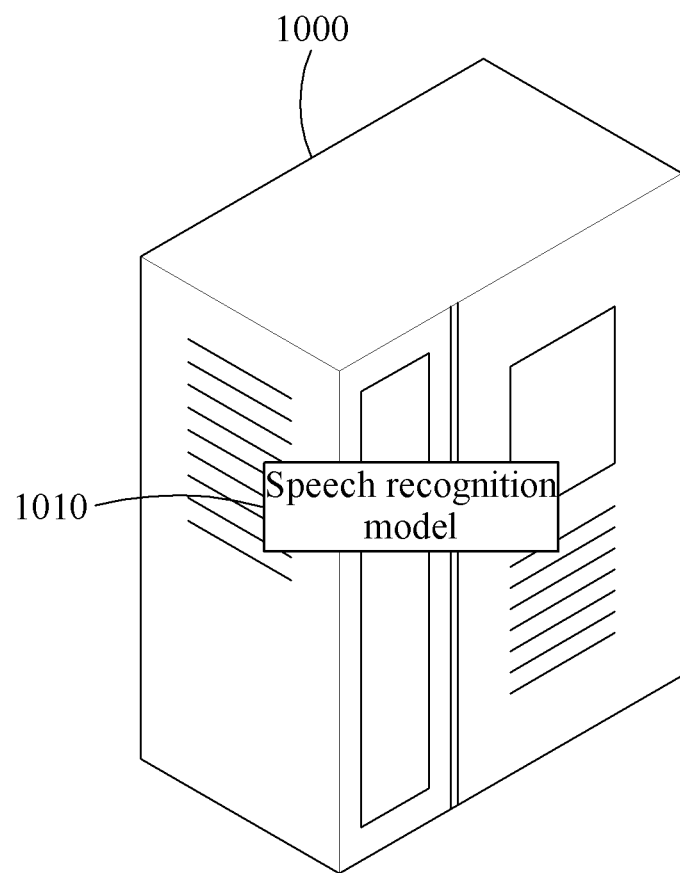
FIGS. 10 and 11 illustrate examples of speech processing apparatuses.
Figure 11:
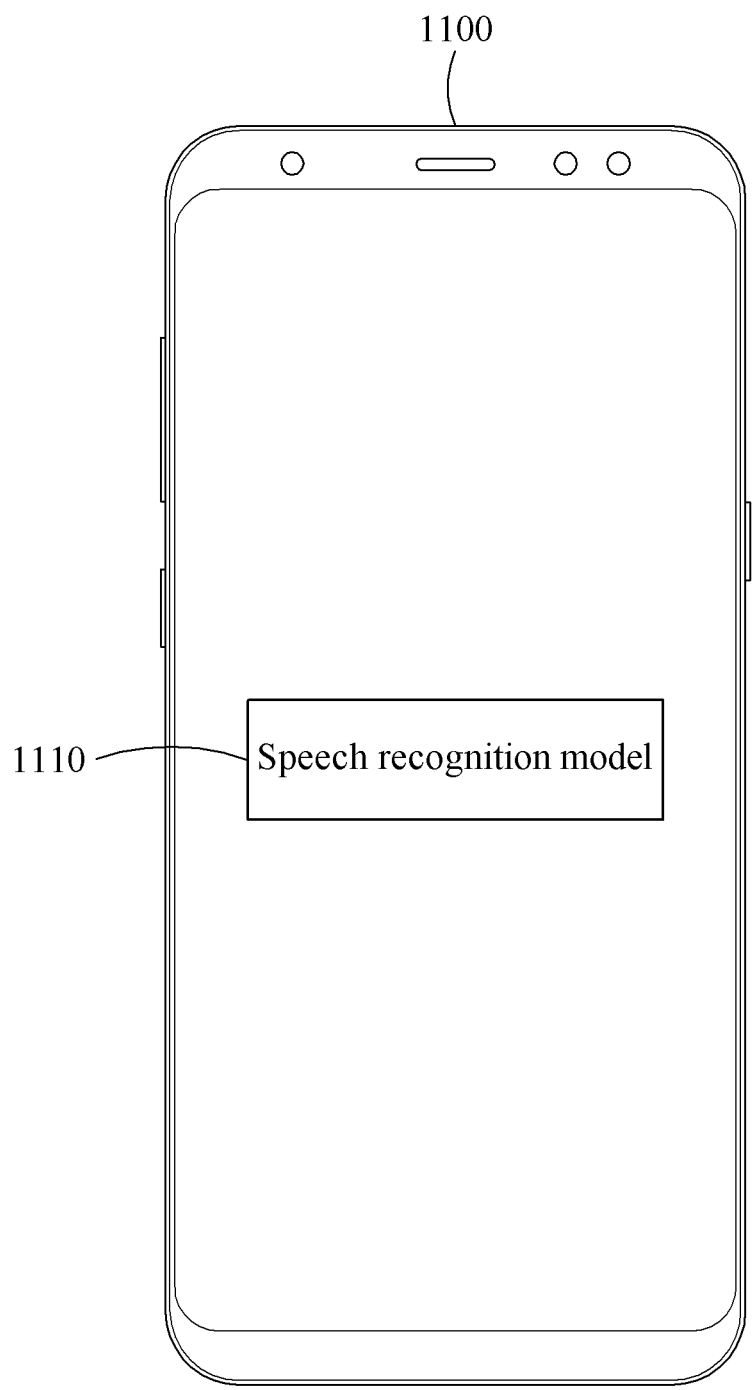

FIGS. 10 and 11 illustrate examples of speech processing apparatuses.

In FIG. 10, a speech processing apparatus may be implemented as a server 1000.

The server 1000 is a separate device different from a user terminal controlled by a user, and may communicate with the user terminal through a wired and/or wireless network. A speech signal of the user may be collected by the user terminal and transmitted to the server 1000 through the network, and the server 1000 may recognize the speech signal using a speech recognition model 1010 according to the speech processing method described above. In this example, the speech recognition model 1010 may be used. Then, the server 1000 may return a speech recognition result to the user terminal. For example, the user terminal may include various computing devices such as a smart phone, a tablet, a laptop and a personal computer, various wearable devices such as a smart watch and smart glasses, various home appliances such as a smart speaker, a smart TV and a smart refrigerator, a smart car, a smart kiosk, and an Internet of things (IoT) device.

The user terminal may simply provide the user with the recognition result received from the server 1000, or perform a subsequent operation based on the recognition result. For example, the subsequent operation may include, but not limited thereto, outputting response information with respect to a question from the user asking the weather, performing an instruction from the user to play music, inputting a text into an input box displayed on the user terminal, or interpreting or translating the speech recognition result into another language.

In FIG. 11, a speech processing apparatus may be implemented as a user terminal 1100. In FIG. 11, the user terminal 1100 is illustrated as a smart phone for ease of description. However, any device controlled by the user may be applicable thereto without limitation. The user terminal 1100 may obtain a speech signal directly from the user and recognize the speech signal using a speech recognition model 1110 according to the speech processing method described above. Then, the user terminal may simply provide the user with a recognition result, or perform a subsequent operation based on the recognition result.

The encoder 110, decoder 120, speech signal 130, character sequence 140, speech processing apparatus 900, memory 910, processor 920, input/output interface 930, server 1000, speech recognition model 1010, 1110, and user terminal 1100 in FIGS. 1-11 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method, the method comprising:
    determining a target segment from a speech signal;
    determining a target character sequence corresponding to the target segment by decoding the target segment;
    identifying a first overlapping portion between the target character sequence and a preceding character sequence based on a cost applied to an edit distance; and
    merging the target character sequence and the preceding character sequence based on the first overlapping portion,
    wherein the cost applied to the edit distance is determined based on any one or any combination of any two or more of a type of operation performed at the edit distance, whether characters to be operated are located in the first overlapping portion, and whether the characters to be operated match.

2. The method of claim 1, wherein the cost for the edit distance is applied differently to the first overlapping portion and a non-overlapping portion between the target character sequence and the preceding character sequence.

3. The method of claim 1, wherein an insertion cost for the edit distance incurred in a non-overlapping portion between the target character sequence and the preceding character sequence is less than an insertion cost incurred in the first overlapping portion.

4. The method of claim 1, wherein a matching cost for the edit distance is less than an insertion cost for the edit distance incurred in a non-overlapping portion between the target character sequence and the preceding character sequence.

5. The method of claim 1, wherein an insertion cost, a deletion cost, and a substitution cost for the edit distance incurred in the first overlapping portion are positive numbers.

6. The method of claim 1, wherein a matching cost for the edit distance is a negative number, and
    an insertion cost for the edit distance incurred in a non-overlapping portion between the target character sequence and the preceding character sequence is zero.

7. The method of claim 1, wherein the determining of the target segment from the speech signal comprises determining the target segment from the speech signal based on a segment length and an overlap length between segments.

8. The method of claim 7, wherein the overlap length between the segments is determined based on available resources of an apparatus that performs the method.

9. The method of claim 1, wherein the identifying comprises identifying a second overlapping portion between the target character sequence and a partial sequence extracted from the preceding character sequence according to a maximum character length to be uttered by a user during an overlap length between segments.

10. The method of claim 1, wherein the preceding character sequence is determined based on a result of decoding a preceding segment partially overlapping the target segment in the speech signal.

11. The method of claim 10, wherein the identifying comprises identifying a third overlapping portion between the target segment and the result of decoding the preceding segment included in the preceding character sequence.

12. The method of claim 10, wherein the first overlapping portion in the target segment is less than half the target segment.

13. A non-transitory computer-readable storage medium storing instructions that, when executed by one or more processors, configure the one or more processors to perform the method of claim 1.

14. An apparatus, the apparatus comprising:
    one or more processors configured to:
        determine a target segment from a speech signal,
        determine a target character sequence corresponding to the target segment by decoding the target segment,
        identify an overlapping portion between the target character sequence and a preceding character sequence based on a cost applied to an edit distance, and
        merge the target character sequence and the preceding character sequence based on the overlapping portion,
    wherein the cost applied to the edit distance is determined based on any one or any combination of any two or more of a type of operation performed at the edit distance, whether characters to be operated are located in the overlapping portion, and whether the characters to be operated match.

15. The apparatus of claim 14, wherein the cost for the edit distance is applied differently to a non-overlapping portion between the target character sequence and the preceding character sequence and to the overlapping portion.

16. The apparatus of claim 14, wherein a matching cost for the edit distance is less than an insertion cost for the edit distance incurred in a non-overlapping portion between the target character sequence and the preceding character sequence.

17. The apparatus of claim 14, wherein an insertion cost, a deletion cost, and a substitution cost for the edit distance incurred in the overlapping portion between the target character sequence and the preceding character sequence are positive numbers.

18. The apparatus of claim 14, wherein the one or more processors are configured to
determine the target segment from the speech signal based on a segment length and an overlap length between segments.

19. The apparatus of claim 18, wherein the overlap length between the segments is determined based on available resources of the apparatus.

20. The apparatus of claim 14, wherein the preceding character sequence is determined based on a result of decoding a preceding segment partially overlapping the target segment in the speech signal.

21. A method, the method comprising:
determining segments from a speech signal;
determining character sequences to the segments, respectively, by decoding the segments;
identifying overlapping portions between adjacent ones of the character sequences based on a cost applied to each of the corresponding edit distances of the adjacent ones of the character sequences; and
merging the adjacent ones of the character sequences based on corresponding ones of the overlapping portions, wherein the cost applied to each of the corresponding edit distances is determined based on any one or any combination of any two or more of a type of operation performed at a corresponding one of the edit distances, whether characters to be operated are located in a corresponding one of the overlapping portions, and whether the characters to be operated match.

22. The method of claim 21, wherein the cost applied to each of the corresponding edit distances is applied differently to corresponding ones of the overlapping portions and non-overlapping portions between the adjacent ones of the character sequences.

23. The method of claim 21, wherein insertion costs for the corresponding edit distances in corresponding ones of the non-overlapping portions and the overlapping portions are different.

24. The method of claim 21, wherein insertion costs, deletion costs, and substitution costs for the edit distance incurred in the overlapping portions are positive numbers.

25. The method of claim 21, wherein the determining of the segments from the speech signal is based on respective segment lengths and overlap lengths between adjacent segments.

26. The method of claim 25, wherein the overlap lengths between the adjacent segments are determined based on available resources of an apparatus that performs the method.

* * * * *